United States Patent
Ledford

[15] 3,681,446
[45] Aug. 1, 1972

[54] PROCESS FOR THE PRODUCTION OF PARA-CHLORO-BENZOIC ACID

[72] Inventor: Nathan Dale Ledford, Chattanooga, Tenn.

[73] Assignee: Velsical Chemical Corporation, Chattanooga, Tenn.

[22] Filed: April 1, 1970

[21] Appl. No.: 24,875

Related U.S. Application Data

[63] Continuation-in-part of Ser. No. 580,188, Sept. 19, 1966, abandoned.

[52] U.S. Cl. .............................................260/524 R
[51] Int. Cl. ..............................................C07c 63/02
[58] Field of Search ..................................260/524 R

[56] References Cited

UNITED STATES PATENTS 2,727,919  12/1955  Saunders ......................260/524
2,245,528   6/1941  Loder ...........................260/524

FOREIGN PATENTS OR APPLICATIONS 842,998  8/1960  Great Britain................260/524

OTHER PUBLICATIONS

Wagner et al., " Synthetic Organic Chemistry," 1953, pages 421– 422.
Emerson et al., J. Am. Chem. Soc., 71, May, 1949, pages 1,742– 1,743.

*Primary Examiner*—Lewis Gotts
*Assistant Examiner*—R. S. Weissberg
*Attorney*—Robert J. Schwarz

[57] ABSTRACT

This invention discloses a new process for preparing para-chlorobenzoic acid from a mixture of ortho- and para-chlorotoluene containing at least 10 percent of the para isomer which comprises oxidizing said mixture by means of an oxygen containing gas in a liquid reaction medium consisting of lower monocarboxylic acid, a carboxylic anhydride or mixtures thereof in the presence of an oxidation catalyst and thereafter recovering the precipitated para-chlorobenzoic acid from the reaction mixture.

8 Claims, No Drawings

PROCESS FOR THE PRODUCTION OF PARA-CHLORO-BENZOIC ACID

This application is a continuation-in-part of my copending application Ser. No. 580,188 filed Sept. 19, 1966, now abandoned.

This invention relates to a new process for the production of para-chlorobenzoic acid. More particularly, this invention relates to a method for preparing para-chlorobenzoic acid from a mixture of ortho- and para-chlorotoluene by oxidation.

The preparation of chlorobenzoic acid is described in the art and one commercially significant process comprises the oxidation of the corresponding chlorotoluene. U.S. Pat. No. 2,245,528 issued to Donald J. Loder describes the production of aromatic acids by oxidation of alkyl substituted aromatic hydrocarbons. Thus, para-chlorobenzoic acid, for example, can be prepared by subjecting para-chlorotoluene to suitable oxidation conditions. However, pure para-chlorotoluene starting material is not readily available on a commercial basis since the preparation of this compound via the ring chlorination of toluene in the presence of iron and the absence of light produces an ortho-para isomeric mixture which is difficult to separate due to the similarity in boiling points of the components. The separation of ortho- and para-chlorotoluene by fractional distillation requires about 100 theoretical plates and is therefore impractical.

Heretofore the prior art lacks a teaching whereby pure para-chlorobenzoic acid can be directly prepared without the requirement for a starting material free of isomers. As a result a process for preparing para-chlorobenzoic acid required the difficult separation of the para-chlorotoluene from its ortho-isomer or the separation of the para-chloro-benzoic acid from the ortho-chlorobenzoic acid if the isomeric mixture of chlorotoluene was used.

It has now been found that para-chlorobenzoic acid can be directly prepared from a mixture of ortho- and para-chlorotoluene. Moreover, it has been found that by utilizing the process of the present invention substantially pure para-chlorobenzoic acid can be prepared from a mixture of ortho- and para-chlorotoluene without the use of any purification of the products. Furthermore, the utilization of the process of this invention results in the formation of the desired product as a precipitate which can be readily recovered from the reaction mixture by filtration or other simple means in the art. These and other advantages are realized by subjecting the mixture of ortho- and para-toluene containing at least 10% of the para isomer to oxidation conditions in an organic reaction medium comprising a lower monocarboxylic acid, a carboxylic anhydride or mixtures thereof.

Thus, one embodiment of the present invention resides in a process for preparing para-chlorobenzoic acid from a mixture of ortho- and para-chlorotoluene containing at least 10 percent of the para-isomer which comprises oxidizing said mixture by means of an oxygen containing gas in a liquid reaction medium comprising a lower monocarboxylic acid, a carboxylic anhydride or mixture thereof in the presence of an oxidation catalyst and thereafter recovering the precipitated para-chlorobenzoic acid from the reaction mixture.

Another and preferred embodiment of the present invention resides in a process for preparing para-chlorobenzoic acid from a mixture of ortho- and para-chlorotoluene containing at least 10 percent of the para-isomer which comprises oxidizing said mixture by means of an oxygen containing gas in a liquid reaction medium comprising acetic acid, acetic anhydride or mixtures thereof in the presence of a catlytic amount of a cobalt halide and thereafter recovering the precipitated para-chlorobenzoic acid.

The oxidation of the isomeric mixture of chlorotoluene can be carried out by passing an oxygen containing gas, such as air, oxygen enriched air or oxygen itself, through a solution of the isomeric mixture in a lower monocarboxylic acid, carboxylic anhydride or a mixture thereof at temperatures ranging from about 80° C to about 300° C for a period of from about 1 to about 100 hours.

The yield of para-chlorobenzoic acid can be substantially increased by utilizing one or more oxidation catalysts. A variety of polyvalent metals, their salts or oxides are suitable for this purpose such as the metals or compounds of cerium, copper, manganese, barium and vanadium. The preferred catalyst for the purpose of this process of this invention, however, are compounds of cobalt, and most preferred are cobalt halides particularly cobalt chloride. The amount of catalysts which can be used can vary from about 0.05 percent to about 5.0 percent by weight based on the total weight of chlorotoluene used. A preferred amount of catalyst, particularly when cobalt halides are employed, ranged from about 0.1 percent to about 2.0 percent by weight based on the chlorotoluene used. Oxidation initiators or compounds which facilitate the attack upon the hydrocarbon molecule by the molecular oxygen, such as peroxides, peracids or peroxide forming compounds can be advantageously used in the process of this invention in an amount of from about 0.1 to about 10 percent by weight based upon the chlorotoluene used.

The oxidation of the isomeric mixture of chlorotoluene can conveniently be carried out at atmospheric pressure particularly when oxygen or oxygen enriched air is used as the oxidizing agent. However, superatmospheric pressures can be used to shorten the reaction times and pressures ranging up to about 50 atmospheres are useful.

As mentioned above, the temperatures at which the process of this invention can be carried out can vary from about 80° to about 300° C depending upon such factors as pressure, the particular oxidizing gas used and the desired reaction time. Thus, lower temperatures are suitable when oxygen rich gases and/or high pressures are used and higher temperatures are preferred when air and atmospheric pressure are used.

The amount of lower monocarboxylic acid, carboxylic anhydride or mixtures thereof which can be used as the reaction medium is not critical provided it is sufficient to solvate the starting material chlorotoluene mixture under the particular reaction conditions employed. The presence of a carboxylic anhydride in the reaction mixture is preferred for the purpose of reacting with any water which is formed during reaction. As a result a most preferred reaction medium for carrying out the process of this invention is a mixture of acetic acid and acetic anhydride.

The manner in which the process of the present invention can be carried out readily is more specifically illustrated in the following examples.

EXAMPLE 1

A mixture of isomeric chlorotoluenes (759 grams) having a composition as determined by gas chromatographic analysis of 38 and 62 percent by weight of the para- and ortho-isomers respectively, cobaltous chloride (7.7 grams), acetic acid (3,000 grams) and acetic anhydride (673 grams) were charged into a reaction vessel equipped with a mechanical stirrer, reflux condenser, gas sparger and a gas exit means. The reaction mixture was heated at a temperature of about 114° C and oxygen was passed through the mixture at atmospheric pressure for a period of about 40 hours. After this time the reaction mixture was cooled and filtered to recover the white crystalline solid which had formed. This solid was washed with water and was dried to yield 207 grams of para-chlorobenzoic acid having an assay of 100 percent acidity and 100 percent para-isomer.

EXAMPLE 2

A mixture of ortho- and para- chlorotoluene (500 grams; 40 percent ortho- and 60 percent para-isomers), cobaltous chloride (5.0 grams) and acetic anhydride (2,000 grams) are charged into a pressure vessel equipped with stirring, temperature controlling and gas sparging means. The reaction mixture is heated to a temperature of about 150° C and air is passed through the reaction mixture at a pressure of about 50 atmospheres for a period of about 3 hours. After this time the reaction mixture is cooled and the desired para-chlorobenzoic acid is recovered as a white solid by filtration.

EXAMPLE 3

A mixture of ortho- and para-chlorotoluene (1,000 grams; 60 percent ortho- and 40 para-isomers), cobaltous chloride catalyst (10 grams), acetic acid (3,000 grams) and acetic anhydride (1,000 grams) are charged into a reaction vessel equipped with stirrer, heating mantle, gas inlet tube and reflux condenser. The reaction mixture is heated at 300° C and air is passed through the mixture for a period of about 24 hours. After this time the reaction mixture is cooled and the para-chlorobenzoic acid is recovered as a white crystalline solid by filtration.

EXAMPLE 4

A mixture of ortho- and para-chlorotoluene (1,000 grams, 90 percent ortho- and 10 percent para-isomers), cobaltous chloride catalyst (10 grams), acetic acid (3,000 grams) and acetic anhydride (1,000 grams) are charged into a reaction vessel equipped with stirrer, heating mantle, gas inlet tube and reflux condenser. The reaction mixture is heated at 80° C and oxygen is passed through the mixture for a period of about 6 hours. After this time the reaction mixture is cooled and the para-chlorobenzoic acid is recovered as a white crystalline solid by filtration.

I claim:

1. A process for preparing para-chlorobenzoic acid from a mixture of ortho- and para-chlorotoluene containing at least 10 percent of the para-isomer which comprises oxidizing said mixture by means of an oxygen containing gas in a liquid reaction medium comprising a lower monocarboxylic acid and a carboxylic anhydride in the presence of an oxidation catalyst and thereafter recovering the precipitated para-chlorobenzoic acid from the reaction mixture.

2. The process of claim 1 wherein the monocarboxylic acid is acetic acid and the carboxylic anhydride is acetic anhydride.

3. The process of claim 1 wherein the oxidation is carried out at a temperature from about 80° C to about 300° C.

4. The process of claim 1 wherein the oxidation catalyst is a cobalt halide.

5. The process of claim 1 wherein the oxidation is carried out at atmospheric pressure.

6. The process of claim 1 wherein the oxidation is carried out at superatmospheric pressure below about 50 atmospheres.

7. The process of claim 5 wherein the oxidizing gas is oxygen.

8. The process of claim 6 wherein the oxidizing gas is air.

* * * * *